(12) United States Patent
Stafford

(10) Patent No.: US 12,146,335 B2
(45) Date of Patent: *Nov. 19, 2024

(54) PORTABLE STRUCTURE WITH SOLAR SHADE

(71) Applicant: XFS Global, LLC, Edina, MN (US)

(72) Inventor: Robert Stafford, Henderson, NV (US)

(73) Assignee: XFS Global, LLC, Edina, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/126,620

(22) Filed: Mar. 27, 2023

(65) Prior Publication Data

US 2023/0304316 A1 Sep. 28, 2023

Related U.S. Application Data

(63) Continuation of application No. 17/000,709, filed on Aug. 24, 2020, now Pat. No. 11,613,906, which is a continuation of application No. 15/920,209, filed on Mar. 13, 2018, now Pat. No. 10,753,119.

(60) Provisional application No. 62/471,246, filed on Mar. 14, 2017.

(51) Int. Cl.
*E04H 15/20* (2006.01)
*E04H 15/18* (2006.01)

(52) U.S. Cl.
CPC .............. *E04H 15/20* (2013.01); *E04H 15/18* (2013.01); *E04H 2015/203* (2013.01); *E04H 2015/205* (2013.01); *E04H 2015/207* (2013.01)

(58) Field of Classification Search
CPC ... E04H 15/18; E04H 15/20; E04H 2015/201; E04H 2015/205; E04H 2015/207
See application file for complete search history.

(56) References Cited

U.S. PATENT DOCUMENTS

| | | |
|---|---|---|
| 645,890 A | 3/1900 | Conrad |
| 2,225,972 A | 12/1940 | Brogren |
| 2,350,904 A | 6/1944 | Edward |
| 2,500,940 A | 3/1950 | Fischer et al. |
| 2,823,683 A | 2/1958 | Vincent et al. |
| 2,963,127 A | 12/1960 | Dewey |
| 2,986,150 A * | 5/1961 | Torian ................. A01G 9/1407 52/63 |
| 2,989,154 A | 6/1961 | Colby |
| 3,058,549 A | 10/1962 | Anderson |
| 3,062,340 A | 11/1962 | Mauritz |
| 3,215,153 A | 11/1965 | Huddle |

(Continued)

FOREIGN PATENT DOCUMENTS

| | | |
|---|---|---|
| AT | 179434 B | 8/1954 |
| CN | 106284804 A | 1/2017 |

(Continued)

*Primary Examiner* — David R Dunn
*Assistant Examiner* — Danielle Jackson
(74) *Attorney, Agent, or Firm* — Dorsey & Whitney LLP

(57) ABSTRACT

A portable structure including a solar shade is disclosed. The portable structure includes a frame comprising at least two beams, a main panel extending between the at least two beams, and a solar shade. The solar shade includes at least one solar shade panel spaced above the main panel by at least one inflatable beam to create a space between the solar shade panel and the main panel. The space creates an insulative layer to help regulate an interior temperature of the portable structure.

18 Claims, 5 Drawing Sheets

(56) References Cited

U.S. PATENT DOCUMENTS

| | | |
|---|---|---|
| 3,255,769 A | 6/1966 | Lloyd |
| 3,273,574 A | 9/1966 | Huddle |
| 3,376,879 A | 4/1968 | Huddle |
| 3,388,711 A | 6/1968 | Huddle |
| 3,424,178 A | 1/1969 | Yazaki |
| 3,465,764 A | 9/1969 | Huddle |
| 3,469,587 A | 9/1969 | Folkes |
| 3,496,687 A | 2/1970 | Greenberg et al. |
| 3,513,608 A | 5/1970 | Nagrod |
| 3,530,623 A | 9/1970 | Burton |
| 3,633,326 A | 1/1972 | Mcknight et al. |
| 3,636,676 A | 1/1972 | Moss |
| 3,640,296 A | 2/1972 | Huddle |
| 3,670,747 A | 6/1972 | Pohl et al. |
| 3,675,380 A | 7/1972 | Moss |
| 3,699,987 A | 10/1972 | Huddle |
| 3,708,928 A | 1/1973 | Gaspers |
| 3,708,944 A | 1/1973 | Miyake |
| 3,726,294 A | 4/1973 | Huddle |
| 3,744,205 A | 7/1973 | Moss |
| 3,745,725 A | 7/1973 | Boucaud |
| 3,760,550 A | 9/1973 | Mueller et al. |
| 3,780,477 A | 12/1973 | Sprung |
| 3,802,450 A | 4/1974 | Huddle |
| RE28,012 E | 5/1974 | Huddle |
| 3,811,454 A | 5/1974 | Huddle |
| 3,818,669 A | 6/1974 | Moss |
| 3,826,270 A | 7/1974 | Hentges |
| 3,837,405 A | 9/1974 | Huddle |
| 3,838,726 A | 10/1974 | Vredevoogd |
| 3,845,591 A | 11/1974 | Stine |
| 3,856,029 A | 12/1974 | Huddle |
| 3,869,836 A | 3/1975 | Allen |
| 3,872,634 A | 3/1975 | Seaman |
| 3,886,699 A | 6/1975 | Bergmann |
| 3,899,854 A | 8/1975 | Huddle |
| 3,909,993 A | 10/1975 | Huddle |
| 3,921,349 A | 11/1975 | Kolozsvary |
| 3,953,955 A | 5/1976 | Huddle |
| 3,958,588 A | 5/1976 | Huddle |
| 3,961,638 A | 6/1976 | Huddle |
| 3,968,604 A | 7/1976 | Hills |
| 3,973,364 A | 8/1976 | Seaman |
| 3,990,194 A | 11/1976 | Huddle |
| 4,004,382 A | 1/1977 | Carlson |
| 4,028,861 A | 6/1977 | Huddle |
| 4,033,367 A | 7/1977 | Johnston |
| 4,034,772 A | 7/1977 | Huddle et al. |
| 4,036,244 A | 7/1977 | Huddle |
| 4,041,659 A | 8/1977 | Mcelhoe |
| 4,065,906 A | 1/1978 | Mears |
| 4,073,098 A | 2/1978 | Baker |
| 4,091,584 A | 5/1978 | Brown |
| 4,092,992 A | 6/1978 | Huddle |
| 4,096,669 A | 6/1978 | Pabst |
| 4,118,904 A | 10/1978 | Sprung |
| 4,121,604 A | 10/1978 | Rain |
| 4,137,687 A | 2/1979 | Sprung |
| 4,148,332 A | 4/1979 | Huddle |
| RE30,044 E | 7/1979 | Huddle |
| 4,175,361 A | 11/1979 | Kumode |
| 4,188,756 A | 2/1980 | Ljungbo |
| 4,229,914 A | 10/1980 | Lucas |
| 4,271,644 A | 6/1981 | Rilliet |
| 4,275,537 A | 6/1981 | Pinson |
| 4,280,306 A | 7/1981 | Milinic |
| 4,290,243 A | 9/1981 | Mellin |
| 4,325,207 A | 4/1982 | Russell et al. |
| 4,347,690 A | 9/1982 | Wallace |
| 4,373,305 A | 2/1983 | Russell |
| 4,404,980 A | 9/1983 | Wade |
| 4,467,573 A | 8/1984 | Langerbeck |
| 4,527,362 A | 7/1985 | Tobey et al. |
| 4,546,578 A | 10/1985 | Behrmann |
| 4,559,748 A | 12/1985 | Ressel |
| 4,567,696 A | 2/1986 | Malet |
| 4,567,707 A | 2/1986 | Herman |
| 4,583,331 A | 4/1986 | Hunt et al. |
| 4,586,300 A | 5/1986 | Mullin |
| 4,590,717 A | 5/1986 | Ruiz et al. |
| 4,593,710 A | 6/1986 | Stafford et al. |
| 4,641,477 A | 2/1987 | Schleck |
| 4,644,706 A | 2/1987 | Stafford et al. |
| 4,677,999 A | 7/1987 | Cannon et al. |
| 4,766,712 A | 8/1988 | Hale |
| 4,769,962 A | 9/1988 | Pohl et al. |
| 4,773,191 A | 9/1988 | Slack |
| 4,829,735 A | 5/1989 | Zwissler |
| 4,837,990 A | 6/1989 | Peleg |
| 4,841,688 A | 6/1989 | Rinaldi |
| D302,593 S | 8/1989 | Haldorsen |
| 4,858,398 A | 8/1989 | Ricchini |
| 4,878,322 A * | 11/1989 | Ikeda ..................... E04H 15/20 |
| | | 52/63 |
| 4,885,877 A | 12/1989 | Hunt et al. |
| 4,885,879 A | 12/1989 | Plantier |
| 4,926,591 A | 5/1990 | Buijs |
| 4,961,297 A | 10/1990 | Bernard |
| 4,974,387 A | 12/1990 | Dufour |
| 5,026,109 A | 6/1991 | Merlot |
| 5,133,162 A | 7/1992 | Nelson |
| 5,146,722 A | 9/1992 | Stafford |
| 5,189,983 A | 3/1993 | Aitchison |
| RE34,468 E | 12/1993 | Rau et al. |
| 5,269,106 A * | 12/1993 | Stafford ................... E04C 3/40 |
| | | 52/63 |
| 5,283,993 A | 2/1994 | Sprung |
| 5,331,777 A | 7/1994 | Chi-Yuan |
| 5,335,684 A | 8/1994 | Hanninen |
| 5,353,558 A | 10/1994 | Shea et al. |
| 5,381,634 A | 1/1995 | Pietrogrande et al. |
| 5,426,899 A | 6/1995 | Jones |
| 5,487,242 A | 1/1996 | Stafford |
| 5,526,614 A | 6/1996 | Huang |
| 5,544,622 A | 8/1996 | Weelink |
| 5,546,972 A | 8/1996 | Wardell et al. |
| 5,564,234 A | 10/1996 | Vermeulen |
| 5,596,843 A | 1/1997 | Watson |
| 5,597,005 A | 1/1997 | Thomas |
| 5,598,668 A | 2/1997 | Isom |
| 5,634,638 A | 6/1997 | Havens et al. |
| 5,735,100 A | 4/1998 | Campbell |
| 5,771,651 A | 6/1998 | Shiina |
| 5,784,842 A | 7/1998 | Wackerbauer |
| 5,881,515 A | 3/1999 | George |
| 5,964,065 A | 10/1999 | Migurski et al. |
| 5,964,236 A | 10/1999 | Berke |
| 5,974,740 A | 11/1999 | Park |
| 6,003,269 A | 12/1999 | Mcree |
| 6,003,279 A | 12/1999 | Schneider |
| 6,014,948 A | 1/2000 | Gordon |
| 6,073,587 A | 6/2000 | Hill et al. |
| 6,141,902 A | 11/2000 | Boice |
| 6,185,877 B1 | 2/2001 | Lloyd |
| 6,212,850 B1 | 4/2001 | Branson |
| 6,247,484 B1 | 6/2001 | Thomas |
| 6,260,308 B1 | 7/2001 | Looney |
| 6,266,932 B1 | 7/2001 | Van |
| 6,276,094 B1 | 8/2001 | Hays |
| 6,279,288 B1 | 8/2001 | Keil |
| 6,293,057 B1 | 9/2001 | Amos |
| 6,393,769 B1 | 5/2002 | Mertik et al. |
| 6,502,593 B1 * | 1/2003 | Stafford ................... E04H 15/18 |
| | | 52/63 |
| 6,550,491 B1 | 4/2003 | Bixler |
| 6,598,613 B2 * | 7/2003 | Fritzche ................. E04H 15/20 |
| | | 135/124 |
| 6,604,327 B1 | 8/2003 | Reville |
| 6,668,496 B1 | 12/2003 | Clapp et al. |
| 6,679,009 B2 | 1/2004 | Hotes |
| 6,691,488 B2 | 2/2004 | Branson |
| 6,851,227 B1 | 2/2005 | Schildge |
| 7,127,861 B2 | 10/2006 | Arbel et al. |
| 7,185,667 B2 | 3/2007 | Rottmann |

(56) References Cited

U.S. PATENT DOCUMENTS

| | | | |
|---|---|---|---|
| 7,254,922 B2 | 8/2007 | Brockman et al. | |
| 7,273,061 B2* | 9/2007 | Choi | E04H 15/32 135/119 |
| 7,350,244 B1* | 4/2008 | Handley | A47H 23/04 4/558 |
| 7,389,785 B2 | 6/2008 | Loudermilk et al. | |
| D577,092 S | 9/2008 | West | |
| 7,470,093 B2 | 12/2008 | Mansfield | |
| D593,209 S | 5/2009 | Vanelverdinghe | |
| 7,600,348 B1 | 10/2009 | Kostka | |
| 7,654,277 B1 | 2/2010 | Brewer et al. | |
| 7,735,502 B1 | 6/2010 | Hotes | |
| 7,765,748 B2 | 8/2010 | Hawes | |
| 7,814,723 B2 | 10/2010 | Vanelverdinghe | |
| 7,823,337 B2 | 11/2010 | Pope | |
| 7,849,639 B2 | 12/2010 | Sprung | |
| 7,980,029 B2 | 7/2011 | Ahmedy | |
| 8,132,585 B2 | 3/2012 | Rothweil | |
| 8,136,306 B2 | 3/2012 | Scheps | |
| 8,291,648 B1 | 10/2012 | Orr | |
| 8,381,452 B1 | 2/2013 | Forsland et al. | |
| D683,415 S | 5/2013 | Yurianto | |
| 8,522,806 B2 | 9/2013 | Li | |
| 8,671,642 B2 | 3/2014 | Green et al. | |
| 8,701,356 B2 | 4/2014 | Forsland et al. | |
| 8,701,689 B2 | 4/2014 | Warner | |
| 8,707,632 B2 | 4/2014 | Forsland et al. | |
| 8,863,444 B2 | 10/2014 | Bowron | |
| 8,939,164 B2 | 1/2015 | Combs et al. | |
| 9,038,349 B2 | 5/2015 | Fox | |
| 9,085,890 B2 | 7/2015 | Strickland et al. | |
| 9,120,539 B1 | 9/2015 | Binder | |
| 9,163,394 B1 | 10/2015 | Barker | |
| 9,169,631 B2 | 10/2015 | Tate | |
| 9,273,458 B2 | 3/2016 | Davis et al. | |
| 9,303,426 B2 | 4/2016 | Workman et al. | |
| 9,340,994 B2 | 5/2016 | Hotes et al. | |
| 9,388,564 B2 | 7/2016 | Ros Garcia et al. | |
| 9,410,343 B2 | 8/2016 | Hotes | |
| 9,458,621 B2 | 10/2016 | Calafatis et al. | |
| 9,562,352 B2 | 2/2017 | Benthien et al. | |
| 9,611,637 B2 | 4/2017 | Dynon | |
| 9,631,358 B1 | 4/2017 | Trahan | |
| 9,714,523 B2* | 7/2017 | Lilly, II | E04H 15/18 |
| 9,777,471 B2 | 10/2017 | Kasanen et al. | |
| 9,797,126 B2 | 10/2017 | Saggese | |
| 9,915,062 B2 | 3/2018 | Forsland et al. | |
| 10,094,139 B2* | 10/2018 | Hotes | E04H 15/10 |
| 10,161,160 B2 | 12/2018 | Lemoine et al. | |
| 10,167,644 B1 | 1/2019 | Aliev | |
| 10,344,494 B2 | 7/2019 | Volin | |
| 10,508,005 B2 | 12/2019 | Spronken | |
| 10,689,840 B2 | 6/2020 | Bonlin | |
| 10,697,193 B2 | 6/2020 | Tafuro et al. | |
| 10,753,119 B2* | 8/2020 | Stafford | E04H 15/20 |
| 11,613,906 B2* | 3/2023 | Stafford | E04H 15/20 135/121 |
| 11,905,708 B2 | 2/2024 | Scrafford et al. | |
| 2003/0177735 A1 | 9/2003 | Seeba et al. | |
| 2004/0016183 A1 | 1/2004 | Hoffman | |
| 2006/0248807 A1 | 11/2006 | Penna | |
| 2008/0178551 A1 | 7/2008 | Porter | |
| 2008/0295417 A1 | 12/2008 | Turcot | |
| 2009/0151269 A1 | 6/2009 | Eiger et al. | |
| 2009/0188539 A1* | 7/2009 | Hollinger | E04H 15/54 135/115 |
| 2010/0200037 A1* | 8/2010 | Saiz | E04H 15/20 242/147 A |
| 2012/0137601 A1* | 6/2012 | Peelman | E04H 4/10 52/173.3 |
| 2012/0180838 A1* | 7/2012 | Stafford | E04H 15/34 135/157 |
| 2017/0107738 A1* | 4/2017 | Sprung | E04H 15/18 |
| 2018/0352921 A1 | 12/2018 | Arndt et al. | |
| 2023/0034888 A1 | 2/2023 | Stafford | |

FOREIGN PATENT DOCUMENTS

| | | | |
|---|---|---|---|
| DE | 2141953 A1 * | 3/1973 | E04H 15/20 |
| DE | 3243525 A1 | 5/1984 | |
| DE | 4026984 A1 | 2/1992 | |
| DE | 102004010778 A1 | 9/2005 | |
| DE | 202006002629 U1 | 5/2006 | |
| DE | 102011101383 A1 * | 11/2012 | E04H 15/18 |
| EP | 0018962 A2 * | 11/1980 | E04H 15/22 |
| EP | 2835474 A1 | 2/2015 | |
| FR | 972573 A | 1/1951 | |
| FR | 2711691 A1 * | 5/1995 | E04H 15/18 |
| FR | 2974382 A1 | 10/2012 | |
| FR | 2999209 A1 | 6/2014 | |
| FR | 3034801 A1 | 10/2016 | |
| WO | 2015181535 A1 | 12/2015 | |

* cited by examiner

PORTABLE STRUCTURE WITH SOLAR SHADE

CROSS-REFERENCE TO RELATED APPLICATIONS

This application is a continuation of U.S. patent application Ser. No. 17/000,709, filed Aug. 24, 2020, issued on Mar. 28, 2023, as U.S. Pat. No. 11,613,906, which is a continuation of U.S. patent application Ser. No. 15/920,209, filed Mar. 13, 2018, issued on Aug. 25, 2020, as U.S. Pat. No. 10,753,119, and which claims priority to U.S. Provisional Application No. 62/471,246, filed Mar. 14, 2017, each of which is incorporated herein by reference. Any and all applications for which a foreign or domestic priority claim is identified in the Application Data Sheet as filed with the present application are hereby incorporated by reference under 37 CFR 1.57.

BACKGROUND

Field

The present disclosure relates to portable structures, and more particularly, to solar shades for portable structures.

Description

Fabric-covered portable structures are a relatively common form of portable, deployable, and/or semi-permanent shelter. Such structures are frequently used in moderate to severe weather conditions over extended periods of time. In both hot and cold climates, it can be desirable to regulate the internal temperature of such structures in order to make them more hospitable and comfortable.

SUMMARY

In a first aspect, a portable structure includes a frame comprising at least two beams and a main panel a main panel extending between the at least two beams. The portable structure also includes a solar shade. The solar shade includes at least one solar shade panel spaced above the main panel by at least one inflatable beam to create a space between the solar shade panel and the main panel.

In some embodiments, the solar shade panel extends between a first edge and a second edge, and wherein the first and the second edges are each attached to the main panel, and wherein the inflatable beam is positioned between the first edge and the second edge. In some embodiments, the first and second edges are permanently attached to the main panel. In some embodiments, the first and second edges are stitched, welded, or bonded to the main panel. In some embodiments, the first and second edges are releasably attached to the main panel by a hook and loop material, a lace-line, or both.

In some embodiments, the at least one inflatable beam is attached to an underside of the solar shade panel. In some embodiments, the at least one inflatable beam is releasably or permanently attached to the underside of the solar shade panel. In some embodiments, the at least one inflatable beam includes an attachment mechanism configured to releasably attach to the main panel. In some embodiments, the attachment mechanism comprises hook and loop material. In some embodiments, the at least one inflatable beam is permanently attached the main panel. In some embodiments, the permanent attachment comprises stitching, welding or bonding.

In some embodiments, the at least one inflatable beam comprises two inflatable beams. In some embodiments, the two inflatable beams are parallel with the at least two beams of the frame.

In some embodiments, the solar shade panel comprises a fabric material. In some embodiments, the fabric material comprises a mesh material.

In some embodiments, when inflated, the inflatable beam spaces the solar shade panel at least four inches above the main panel.

In some embodiments, the frame comprises a plurality of sections, each section comprising at least two beams. In some embodiments, the solar shade comprises a plurality of solar shade panels, each solar shade panel spaced above a corresponding main panel by at least one inflatable beam.

In some embodiments, a width of the portable structure is wider than 30 feet. In some embodiments, a width of the portable structure is wider than 50 feet. In some embodiments, a width of the portable structure is wider than 80 feet. In some embodiments, a width of the portable structure is wider than 100 feet.

In some embodiments, wherein the solar shade is not connected to ground.

In another aspect, a solar shade for a portable structure is described. The solar shade includes a solar shade panel and at least one inflatable beam configured to space the solar shade panel above a main panel of a portable structure to create a space between the solar shade panel and the main panel.

In some embodiments, the at least one inflatable beam is attached to an underside of the solar shade panel. In some embodiments, the at least one inflatable beam is releasably attached to the underside of the solar shade panel. In some embodiments, the at least one inflatable beam includes an attachment mechanism configured to releasably attach to the main panel. In some embodiments, the attachment mechanism comprises hook and loop material.

In some embodiments, the solar shade panel extends between a first edge and a second edge, and wherein the first and the second edges each comprises an attachment mechanism configured to attach to the main panel. In some embodiments, the attachment mechanism comprises hook and loop material. In some embodiments, the attachment mechanism comprises a lace-line.

In some embodiments, the at least one inflatable beam comprises two parallel inflatable beams.

In some embodiments, the solar shade panel comprises a fabric material. In some embodiments, the fabric material comprises a mesh material. In some embodiments, the portable structure comprises a plurality of sections and wherein the solar shade panel is associated with one of the plurality of sections.

In some embodiments, when inflated, the inflatable beam spaces the solar shade panel about six inches above the main panel.

BRIEF DESCRIPTION OF THE DRAWINGS

The features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

DETAILED DESCRIPTION

Figure 1:
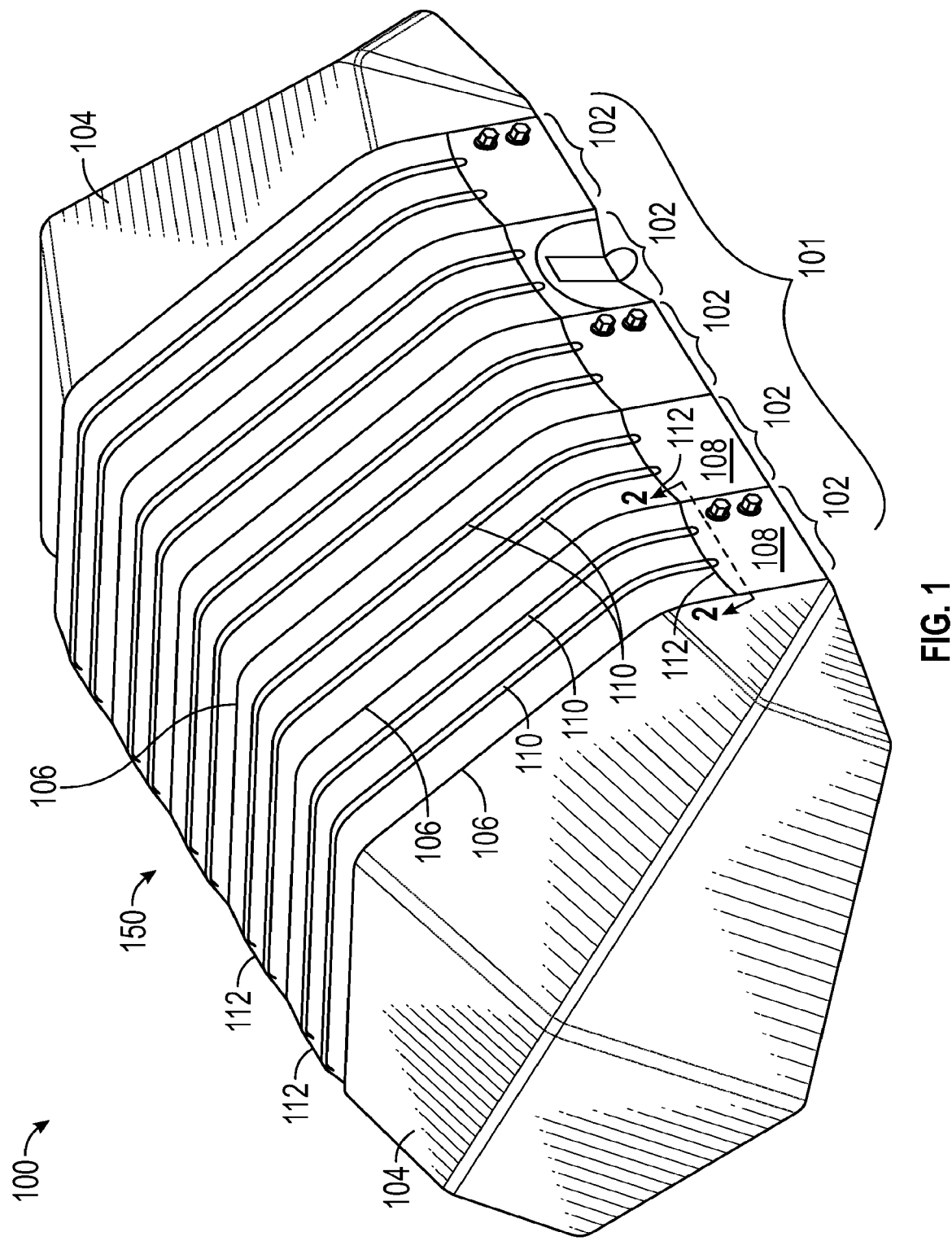
FIG. 1 is a perspective view of one embodiment of a portable structure including a solar shade according to the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments can be utilized, and other changes can be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

FIG. 1 is a perspective view of one embodiment of a portable structure 100 including a solar shade 150. In some embodiments, the portable structure can include a support frame and one or more panels. The panels can be made of a fabric material, for example. Together, the support frame and panels can define an enclosed or partially enclosed space within the portable structure 100. The portable structure 100 can be a semi-permanent structure. A semi-permanent structure can be configured for large-scale and/or long term use, while remaining relatively easy to set up and or take down compared to traditional permanent structure. Semi-permanent structures can provide for example, structural stability and longevity, similar to a permanent structure, while being easy to assembly and portable, like a portable structure. Semi-permanent structures can be used in a variety of situations and environments. For example, semi-permanent structures can be used in military applications. In some embodiments, the portable structure 100 can be a traditional portable structure like a camping-style tent. Several detailed embodiments of portable structures (without solar shades) are described in U.S. patent application Ser. No. 13/349,480, filed Jan. 12, 2012, and entitled "Method of Erecting Portable Structure and Related Apparatus," which is incorporated herein by reference in its entirety and for all purposes. The embodiments of portable structures described in U.S. patent application Ser. No. 13/349,480 are not intended to be limiting in this application, and the solar shade 150 described herein can be used with any type of portable, deployable, and/or semi-permanent shelter or any other type of shelter or structure without limit.

In the illustrated embodiment of FIG. 1, the portable structure 100 includes a main portion 101 and two end cap portions 104. The main portion 101 can be formed from one or more sections 102. In the illustrated embodiment, the main portion 101 includes five sections 102.

In the illustrated embodiment, each section 102 includes a main panel 108 that extends between two beams 106. The beams 106 may form a part of the support frame of the portable structure 100. In the illustrated embodiment, the beams 106 are parallel to each other, although this need not be always be the case. In some embodiments, the beams 106 can be, for example, rectangular beams or tubes, circular beams or tubes, triangular beams or tubes, I-beams, T-beams, extruded beams of any shape, inflatable beams of any shape, tent poles, etc. In some embodiments, adjacent sections 102 of the portable structure 100 can share a beam 106. That is, a beam 106 can be connected to a main panel 108 of a first section 102 on a first side and connected to a main panel 108 of a second section 102 on a second side. As noted previously, the beams 106 can form a part of a support structure or frame for the portable structure 100. The main panels 108 can extend between the beams 106 and at least partially define an enclosed space within the portable structure 100. The main panels 108 can be made from a fabric material.

Each section 102 can also include a corresponding section of the solar shade 150. For example, each section 102 can include one or more inflatable beams 110 and a solar shade panel 112. As will be described below, the inflatable beams 110 can be positioned above the main panels 108 and the solar shade panels 112 can be positioned over the inflatable beams 110. The inflatable beams 110 can space the solar shade panels 112 above the main panels 108 to create a space or isolative layer there between that can help regulate the temperature of the portable structure 100.

In some embodiments, the solar shade 150 is formed only on some of the sections 102 of the portable structure 100; that is, in some embodiments, only some of the sections 102 include inflatable beams 110 and a solar shade panel 112. In some embodiments, the solar shade panel 112 is made from a flexible material. In some embodiments, the solar shade panel 112 is made from a fabric (or fabric-like) material. In some embodiments, the fabric material is a mesh material. In some embodiments, the fabric material is a solid or opaque material. In some embodiments, the fabric material can be made from a material, or can include a layer, adapted to reflect solar radiation.

In some embodiments, the inflatable beams 110 comprise tubes that can be inflated with a gas, such as air. As will be described below in greater detail with reference to FIG. 2, in an inflated configuration, the inflatable beams 110 space the solar shade panel 112 above the main panel 108, creating a space between the solar shade panel 112 and the main panel 108. The space can create an air layer. The space can create an insulative layer that helps to regulate the temperature of the interior of the portable structure 110.

In the illustrated embodiment, the section of the solar shade 150 associated with each section 102 includes two inflatable beams 110. This, however, is merely one example. In some embodiments, each section can include one, two, three, four, five, or more inflatable beams 110. In some embodiments, each section can include at least one, at least two, at least three, at least four, or at least five inflatable beams 110. In some embodiments, each section can include less than one, less than two, less than three, less than four, or less than five inflatable beams 110. In some embodiments, each section 102 includes between one and three, between one and four, between one and five, between two and four, or between two and five inflatable beams 110. Other numbers of inflatable beams 110 can also be used. In some embodiments, the inflatable beams 110 extend across the portable structure 100 in a direction that is substantially parallel to one or more of the beams 106. In some embodiments, the inflatable beams 110 extend across the portable structure 100 in a direction that is perpendicular to, transverse to, or angled with respect to one or more of the beams 106.

In the illustrated embodiment, five sections 102 are shown. In some embodiments, the main portion 101 can comprise other numbers of sections 102. For example, the main portion 101 can comprise one, two, three, four, five, six, seven, eight, nine, ten or more sections 102. In some embodiments, the main portion 101 can comprise at least one, at least two, at least three, at least four, at least five, at least six, at least seven, at least eight, at least nine, at least ten or more sections 102. In some embodiments, the main portion 101 can comprise the main portion 101 can comprise less than two, less than three, less than four, less than five, less than six, less than seven, less than eight, less than nine, or less than ten sections 102. In some embodiments, other numbers of sections 102, as well as any range of values between the listed values, can be used. In some embodiments, the portable structure 100 is modular such that the length of the portable structure 100 can be adjusted by increasing or decreasing the number of sections 102. For example, a shorter portable structure 100 can include fewer sections 102 than a longer portable structure 100. In some embodiments, each section 102 is at least, less than, or between about 6 feet, about 8 feet, about 10 feet, about 12 feet, about 14 feet, about 16 feet, or about 20 feet long, or longer.

In some embodiments, the solar shade 150 can be configured to cover substantially an entire top section of the main portion 101 of the portable structure. In other words, the solar shade 150 can be configured to cover a roof section of the main portion 101. In some embodiments, the solar shade 150 does not cover side sections of the main portion 101 (for example, as illustrated in FIG. 1). In other words, in some embodiments the solar shade 150 does not cover wall sections of the main portion 101. In the illustrated embodiment, the solar shade 150 does not extend all the way to the ground, leaving portions of the main panel 108 exposed on the sides (or walls) of the main portion 101. This can facilitate placement of windows, doors, and various other connections, such as electrical, plumbing, HVAC, and other types of connections into the interior of the portable structure. In some embodiments, the solar shade 150 extends to the ground such that wall portions of the portable structure 100 are covered by the solar shade 150. In some embodiments, windows, doors, and various other connections, such as electrical, plumbing, HVAC, and other types of connections can extend though the solar shade 150.

Figure 6:
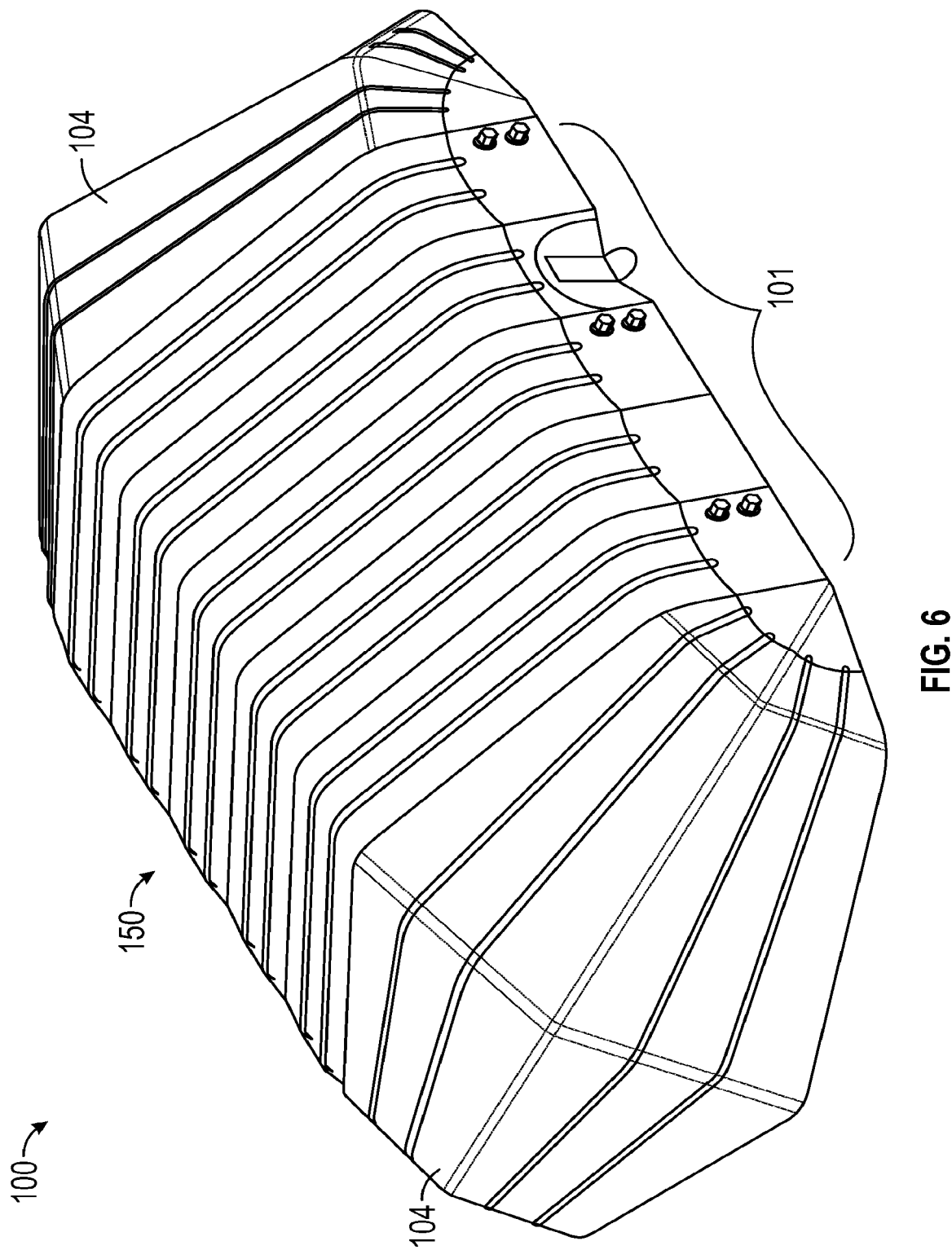
FIG. 6 is a perspective view of an embodiment of a portable structure that includes a solar shade which covers the end cap sections of the portable structure.

In the illustrated embodiment, the end cap portions 104 extend away from the main portion 101 and curve towards the ground. In some embodiments, the end cap portions 104 can be configured with other shapes. For example, in some embodiments, the end cap portions 104 are substantially flat and create a wall that extends vertically between the beams 106 on the end of the main portion 101 and the ground (see, for example, FIG. 1 of U.S. patent application Ser. No. 13/349,480). In some embodiments, end caps portions 104 are omitted and the portable structure 104 is open on one or both ends. Further, although the solar shade 150 does not cover the end cap portions 104 in the embodiment illustrated in FIG. 1, this need not be the case in all embodiments. For example, FIG. 6 is a perspective view of an embodiment of a portable structure 100 that includes a solar shade 150 which covers the end cap sections 104.

Figure 2:
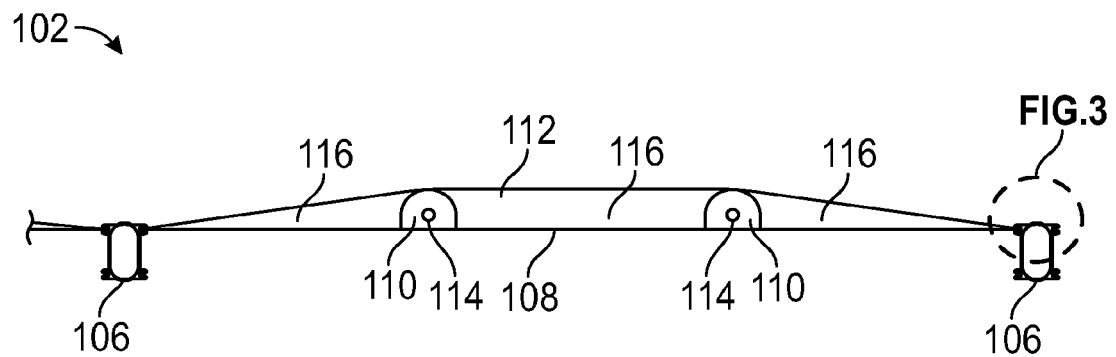
FIG. 2 is a cross-sectional view of a section of the portable structure and solar shade taken along the line shown in FIG. 1.

FIG. 2 is a cross-sectional view of a section 102 of the portable structure 100 and solar shade 150 taken along the line shown in FIG. 1. The section 102 shown in FIG. 2 can be representative of any of the sections 102 of the portable structure 100. In the illustrated embodiment, the beams 106 are extruded beams (made of steel or aluminum, for example), although, as noted previously, any type of beam can be used. As shown in FIG. 2, the main panel 108 extends between the two beams 106. As shown, the inflatable beams 110 space the solar shade panel 112 above the main panel 108. The inflatable beams 110 can be tubes of any cross-sectional shape, including, circular, oval, square, triangular, or any other cross-sectional shape. In some embodiments, one or more sides of the inflatable beams 110 are flat so as to fit against either the main panel 108 or the solar shade panel 112. One or more fastening mechanisms can be included on the inflatable beams 110, the main panel 108, and/or the solar shade panel 112 to secure the inflatable beams 110 to the main panel 108 and/or the solar shade panel 112.

Figure 3:
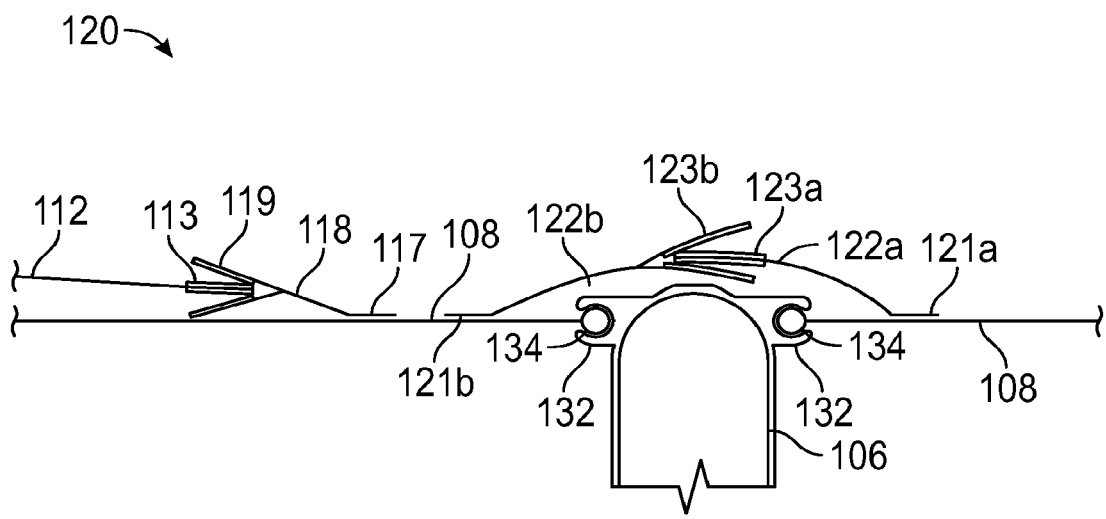
FIG. 3 is a detail view of a portion of FIG. 2, illustrating an embodiment of connections between a top panel, a solar shade panel, and a beam.

In some embodiments, ends or edges of the solar shade panel 112 can be connected to the beams 106 or the main panel 108. FIG. 3, discussed below, illustrates an embodiment of connections between the beams 106 and the main panel 108, as well as an embodiment of connections between the solar shade panel 112 and the main panel 108.

As shown in FIG. 2, each inflatable beam 110 can include a port 114 for inflating/deflating the inflatable beam 110. In some embodiments, each inflatable beam 110 can be inflated individually. In some embodiments, the inflatable beams 110 are interconnected such that they can be inflated via a single port 114. The inflatable beams 110 can be inflated, for example, by connecting a pump (or other gas supply) to the port 114. In some embodiments, the inflatable beams 110 can be deflated by opening the port 114. In some embodiments, a pump can be used to deflate the inflatable beams 110. The inflatable beams 110 can be filled with a gas, such as, air.

In the inflated configuration, the inflatable beams 110 space the solar shade panel 112 above the main panel 108 creating spaces 116 between the solar shade panel 112 and the main panel 108. The spaces 116 can provide an insulative layer that can help regulate the temperature of the portable structure 100. In some embodiments, the spaces 116 can fill with ambient air that either diffuses through the solar shade panel 112 or enters through gaps at the edges of the solar shade 150. The spaces 116 create can create insulative layer that can help regulate the temperature of the portable structure 100. In the illustrated embodiment, with two inflatable beams 110, three spaces 116 are formed: a first space 116 between a first beam 106 and a first inflatable beam 110, a second space 116 between the two inflatable beams 110, and a third space 116 between the second inflatable beam 110 and the second beam 106. Other numbers of spaces 116 are possible depending, in some embodiments, on the number of inflatable beams 110, for example, one, two, three, four, five, six, seven, eight, nine, ten, or more spaces 116 can be created depending on the number of inflatable beams 110 used. In some embodiments, the spaces 116 are interconnected such that air can move freely between them.

In the illustrated embodiments, when inflated, the inflatable beams 110 have a spacing distance (e.g., a diameter, thickness, or height of the inflatable beam 110) of about 6 inches. The spacing distance can determine the distance that the solar shade panel 112 is spaced above the main panel 108. In some embodiments, the spacing distance is about, at least, less than, or between 12 inches, 10 inches, 8 inches, 6 inches, 4 inches, 2 inches, or 1 inch. In some embodiments, the spacing distance is between 12 inches and 1 inch, between 10 inches and 2 inches, between 8 inches and 4 inches, or between 6 inches and 5 inches. In some embodiments, the spacing distance is at least 1 inches, at least 2 inches, at least 4 inches, at least 6 inches, at least 8 inches, at least 10 inches, or at least 12 inches. Other spacing distances are also possible. In some embodiments, the spacing distance can be varied by adjusting the level of inflation of the inflatable beams 110. For example, an inflatable beam 110 can be partially inflated to create a first spacing distance or fully inflated to create a second, larger spacing distance.

FIG. 3 is a detail view of a portion of FIG. 2, illustrating an embodiment of connections between a main panel 108, a solar shade panel 112, and a beam 106. As shown, in some embodiments, the beam 106 can include keder tracks 132 and the edges of the main panel 108 include corresponding keders 134. The keders 134 can be inserted into the keder tracks 134 to connect the main panel 108 to the beam 106. Other methods for attaching the main panel 108 to the beams 106 are also possible, including, for example, hook and loop fasteners, lace-lines, etc.

In some embodiments, the portable structure 100 includes beam covers 120. In some embodiments, the beam covers 120 can cover the beams 106 and the connections between the beams 106 and the main panels 108. The beam covers 120 can help seal (e.g., water-tight or water resistant) the connections between the beams 106 and the main panels 108. In the illustrated embodiment, the beam cover 120 includes a first portion 122a and a second portion 122b. The first portion 122a is attached to the main panel 108 at connection 121a. The connection 121a can be substantially permanent, such as stitched, welded, or bonded, or removable, such as a hook and loop, lace-line, buttons, or other releasable fastening methods. The first portion 121a extends over the beam 106 and includes an attachment mechanism 123a. The second portion 122b is attached to an adjacent main panel 108 at connection 121b by similar methods and extends over the beam 106 to an attachment mechanism 123b. The attachment mechanisms 123a, 123b are configured to engage with each other. In the illustrated embodiment, the attachment mechanisms 123a, 123b form a sandwiched hook and loop connection, although other types of attachment mechanisms can be used.

FIG. 3 also illustrates an example connection between a solar shade panel 112 and a main panel 108. As illustrated, a solar shade connector 118 can be connected to the main panel 108 at connection 117. The connection 117 can be substantially permanent, such as stitched, welded, or bonded, or removable, such as a hook and loop, lace-line, buttons, or other releasable fastening methods. In some embodiments, the connection 117 to the main panel 118 can be made adjacent to (for example, less than 1 inch from, less than 2 inches from, less than 3 inches from, less than 4 inches from, less than 5 inches from, or less than 6 inches from, less than 8 inches from, less than 10 inches from, or less than 12 inches from) the beam 106 or the beam cover 120. The solar shade connector 118 can be a flap that extends from the connection 117 to an attachment mechanism 119. An end of the solar shade panel 112 can include an attachment mechanism 113 configured to attach to the attachment mechanism 119. In the illustrated embodiment, the attachment mechanisms 113, 119 form a sandwiched hook and loop connection, although other types of attachment mechanisms can be used. In some embodiments, a lace-line connection, or a lace-line and hook and loop connection is used.

Figure 4A:
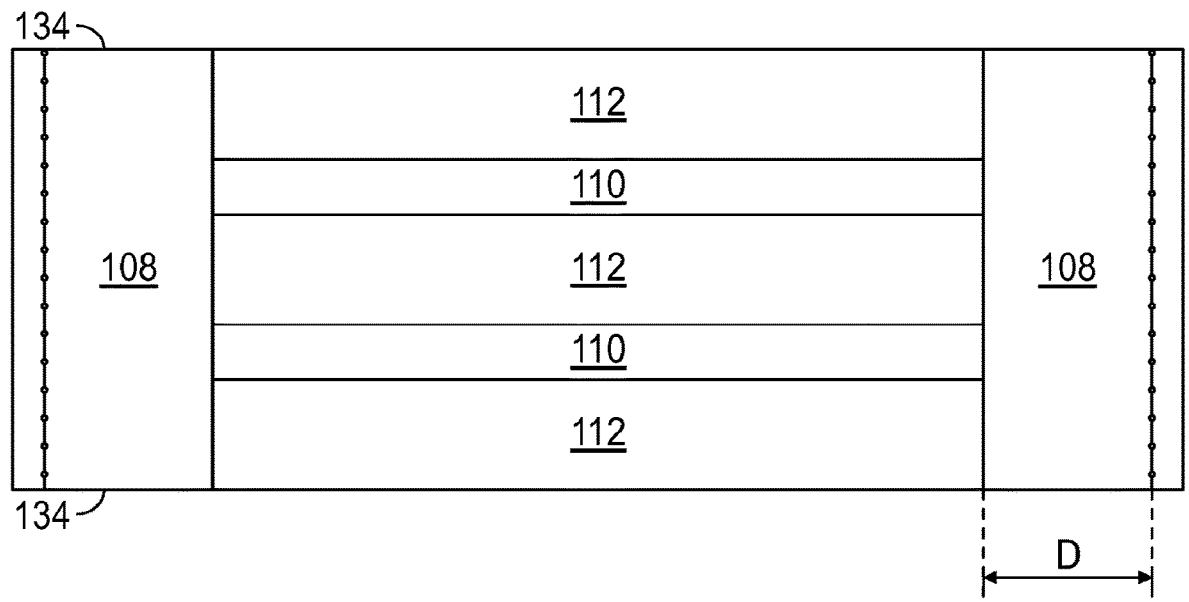
FIG. 4A is a plan view of an embodiment of a top panel including a solar shade panel.

FIG. 4A is a plan view an embodiment of a main panel 108 including a solar shade panel 112. As shown in FIG. 4A, keders 134 can be included along side edges of the main panel 134. The keders 134 can be used to attach the main panel 108 to the beams 106 as described above. In the illustrated embodiment, the solar shade panel 112 covers only a portion of the main panel 108, leaving ends of the main panel 108 exposed. In some embodiments, the exposed ends of the main panel 108 can form the walls of the portable structure 100. For example, the ends of the solar shade panel 112 can be spaced away from the ends of the main panel 108 by a distance D. In some embodiments, the distance D is 2 feet, 4 feet, 6 feet, 8 feet, 12 feet, 14 feet, 16 feet, 18 feet, 20 feet or more. In the illustrated embodiment, the inflatable beams 110 can extend along the main panel 108 only below the solar shade panel 112. In some embodiments, the distance D is zero, such that the length of the solar shade panel 112 is equal to the length of the main panel 108 such that the solar shade panel 112 extends to the ground when the portable structure 100 is assembled. In some embodiments, the length of the inflatable beams 110 is approximately equal to the length of the solar shade panel 112. In some embodiments, the inflatable beams 110 can be longer or shorter than the solar shade panel 112.

Figure 4B:
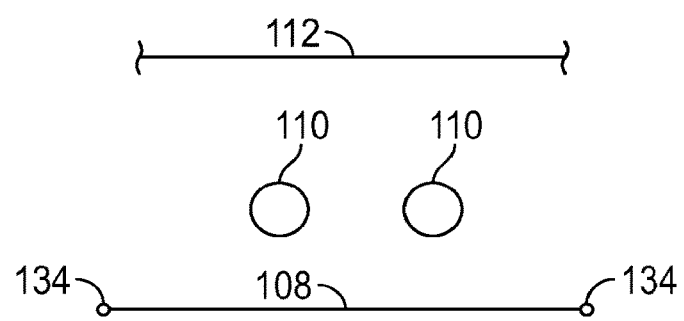
FIG. 4B is an exploded view of the top panel of FIG. 4A.

FIG. 4B is an exploded end view of an embodiment of a main panel 108 including a solar shade panel 112. The main panel 108 (including keders 134), two inflatable beams 110, and the solar shade panel 112 are illustrated. In some embodiments, the inflatable beams 110 are permanently attached to the solar shade panel 112, for example, by stitching, bonding, or welding. In some embodiments, the inflatable beams 108 are removably attached to the solar shade panel 112, for example, by hook and loop material.

In some embodiments, the inflatable beams 110 are permanently attached to the main panel 108, for example, by to the main panel 108, for example, by hook and loop material, stitching, bonding, or welding. In some embodiments, the inflatable beams 108 are removably attached.

In some embodiments, the solar shade panel 112 (e.g., the edges of the solar shade panel 112) is permanently attached to the main panel 108, for example, by stitching, bonding, or welding. In some embodiments, the solar shade panel 112 is releasably attached to the main panel 108, for example, as shown in FIG. 3.

Figure 5:
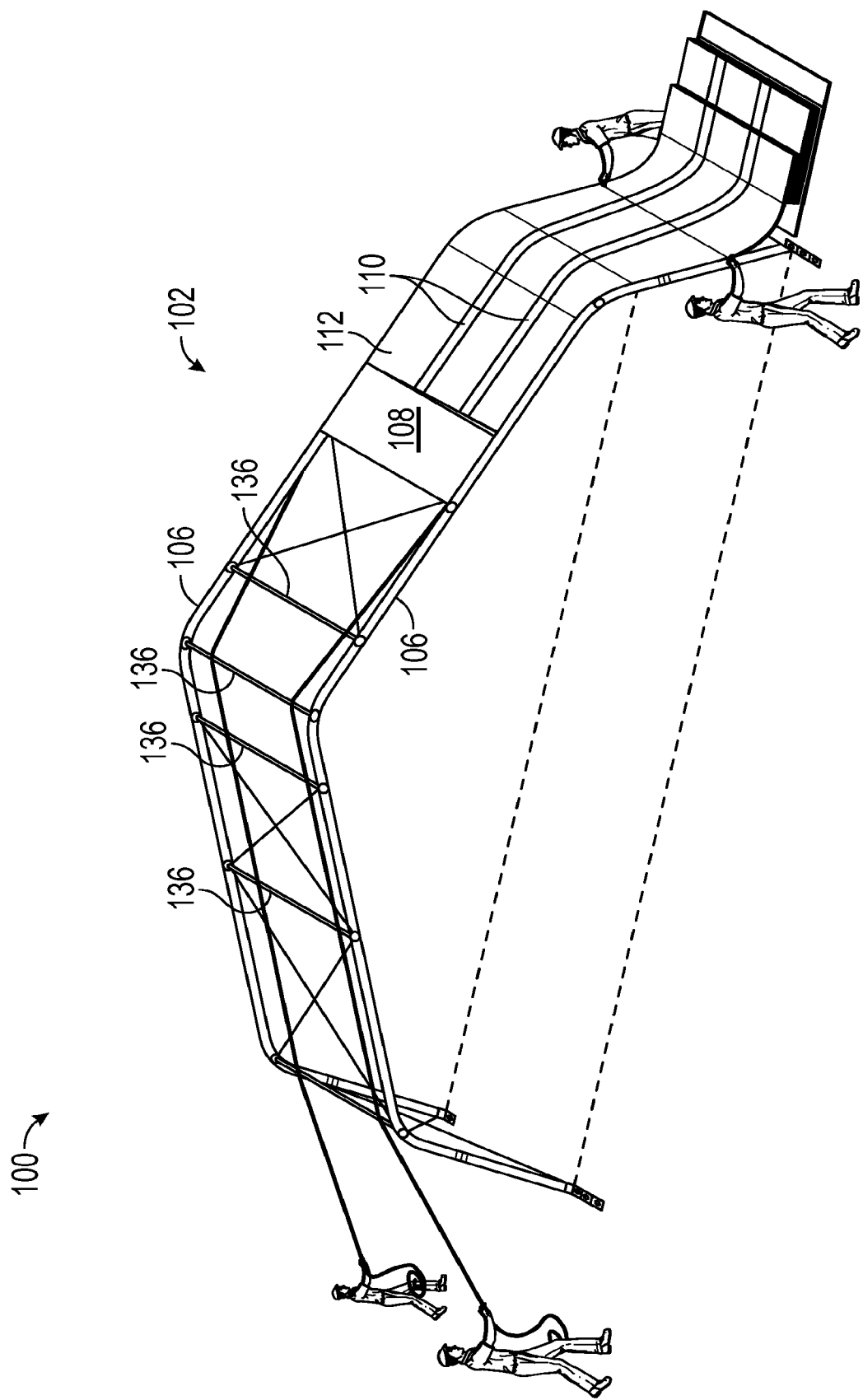
FIG. 5 is a perspective illustration of installation of a top panel including a solar shade on one section of a portable structure according to one embodiment.

FIG. 5 is a perspective illustration of installation of one embodiment of a main panel 108 including a solar shade panel 112 on one section 102 of an embodiment of a portable structure 100. In the illustrated embodiment, the solar shade panel 108 and inflatable beams 110 are attached (either permanently or releasably) to the main panel 108. The inflatable beams 110 are deflated so that the main panel 108, solar shade panel 112, and inflatable beams 110 can be folded flat as shown. To install the main panel 108, the keders are inserted into the keder tracks of the beams 106 and the main panel 108 is pulled from one end of the beams 106 to the other as shown. Because the solar shade panel 108 and inflatable beams 110 are attached to the main panel, they are simultaneously installed along with the main panel 108. When the main panel 108 is fully installed, the inflatable beams 110 can be inflated. Advantageously, this configuration is capable of installation in substantially the same time as a similar portable structure without a solar shade, only requiring one additional step of inflating the inflatable beams 110.

In some embodiments, the main panel 108 can be installed separately and then the inflatable beams 110 and solar shade panel 112 can be attached to the main panel. This can be advantageous because the portable structure 100 can be assembled and the solar shade 150 can be added when needed.

In some embodiments, the solar shade 150 is supported by the main panels 108 and/or beams 106. Thus, advantageously, no additional support structure is necessary for the solar shade 150 and the solar shade 150 is integrated into the portable structure 100. This can decrease installation times and increase the strength of the solar shade 150 as it is tied into the frame of the portable structure 100. In some embodiments, the solar shade 150 need not be connected to ground. Additionally, in some embodiments, each section of the solar shade 150 is associated with one section 102 of the portable structure 100. Accordingly, the size of the solar shade 150 can be increased or decreased along with the size of the portable structure. This can allow the solar shade to be used on large portable structures, for example, portable structures with widths and/or lengths greater than 30 feet, greater than 40 feet, greater than 50 feet, greater than 60 feet, greater than 70 feet, greater than 80 feet, greater than 90 feet, greater than 100 feet, greater than 110 feet, greater than 120 feet, or longer.

While the above detailed description has shown, described, and pointed out novel features of the invention as applied to various embodiments, it will be understood that various omissions, substitutions, and changes in the form and details of the device or process illustrated can be made by those skilled in the art without departing from the spirit of the invention. As will be recognized, the present invention can be embodied within a form that does not provide all of the features and benefits set forth herein, as some features can be used or practiced separately from others. The scope of the invention is indicated by the appended claims rather than by the foregoing description. All changes which come within the meaning and range of equivalency of the claims are to be embraced within their scope.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes can be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures can be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations can be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims can contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A portable structure, comprising:
a frame comprising at least two beams;
a main panel connected to and extending between the at least two beams; and
a removable solar shade installed above the main panel, comprising:
at least one solar shade panel attached to and spaced above the main panel by a first releasable attachment mechanism extending along a first edge of the at least one solar shade panel and a second releasable attachment mechanism extending along a second edge of the at least one solar shade panel; and
at least one inflatable beam positioned between the at least one solar shade panel and the main panel, wherein the at least one inflatable beam spaces the at least one solar shade panel above the main panel to create a space between the at least one solar shade panel and the main panel.

2. The portable structure of claim 1, wherein the at least one solar shade panel extends between the first edge and the second edge, wherein the first and second edges are each attached to the main panel, and wherein the inflatable beam is positioned between the first edge and the second edge.

3. The portable structure of claim 2, wherein the first and second releasable attachment mechanisms comprise a hook and loop material, a lace-line, or a combination thereof.

4. The portable structure of claim 1, wherein the at least one inflatable beam comprises one or more tubular structures inflatable with air or a gas.

5. The portable structure of claim 4, wherein the at least one inflatable beam is releasably or permanently attached to an underside of the at least one solar shade panel.

6. The portable structure of claim 1, wherein the at least one inflatable beam has a further releasable attachment mechanism configured to releasably attach the at least one inflatable beam to the main panel.

7. The portable structure of claim 6, wherein the further releasable attachment mechanism comprises a hook and loop material, a lace line, or a combination thereof.

8. The portable structure of claim 1, wherein the at least one inflatable beam is attached to the main panel by stitching, welding or bonding.

9. The portable structure of claim 1, wherein the at least one inflatable beam comprises at least two inflatable beams oriented substantially parallel to one another.

10. The portable structure of claim 1, wherein the at least one solar shade panel comprises a fabric material, or a mesh material.

11. The portable structure of claim 1, wherein, when inflated, the inflatable beam spaces the at least one solar shade panel at least four inches or ten centimeters above the main panel.

12. The portable structure of claim 1, wherein the removable solar shade is installed above the main panel without a direct connection between the solar shade and ground, independent of the first and second attachment mechanisms attaching the at least one solar shade panel to the main panel.

13. A solar shade for a portable structure, the solar shade comprising:
a removable solar shade panel installed above a main panel of the portable structure, the main panel extending between two beams of the portable structure,
wherein the solar shade panel is releasably attached to the main panel along a first edge and a second edge of the solar shade panel; and
at least one inflatable beam positioned between the solar shade panel and the main panel,
wherein the at least one inflatable beam is configured to space the solar shade panel above the main panel of the portable structure to create a space between the solar shade panel and the main panel;
wherein the solar shade panel extends between the first edge and the second edge, and wherein the first edge and the second edge each has a releasable attachment configured to releasably attach the solar shade panel to the main panel along the respective edge of the solar shade panel.

14. The solar shade of claim 13, wherein the at least one inflatable beam comprises one or more tubular structures inflatable with air or a gas.

15. The solar shade of claim 13, wherein each of the releasable attachments comprises a hook and loop material, a lace line, or a combination thereof.

16. The solar shade of claim 13, wherein the at least one inflatable beam comprises two or more parallel tubular structures inflatable with air or a gas.

17. A method of providing the portable structure of claim 1, comprising:
positioning the frame on a surface, wherein the main panel extends between the at least two beams; and
installing the removable solar shade above the main panel, wherein the at least one inflatable beam is positioned therebetween.

18. A method of providing the solar shade of claim 13, comprising:
installing the removable solar shade panel above the main panel of the portable structure, wherein the at least one inflatable beam is positioned therebetween; and
inflating the at least one inflatable beam, wherein the removable solar shade panel is spaced above the main panel.

* * * * *